Nov. 17, 1931.  J. W. ADAMS  1,832,347
AGRICULTURAL IMPLEMENT
Filed Nov. 28, 1930
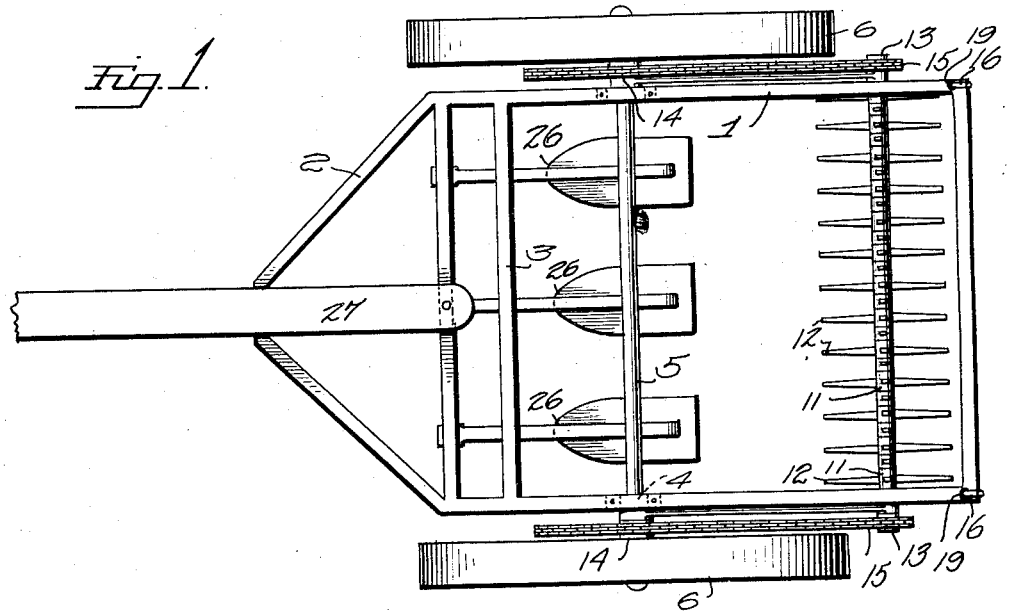
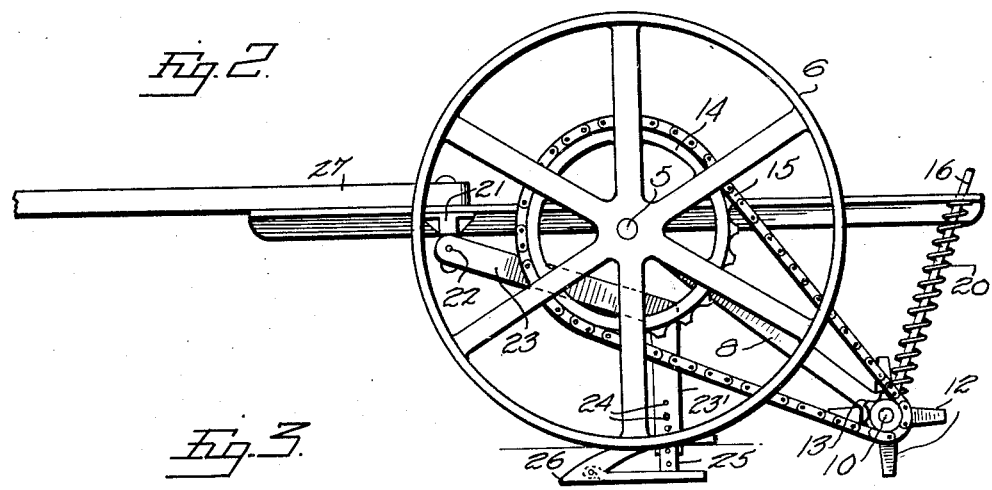
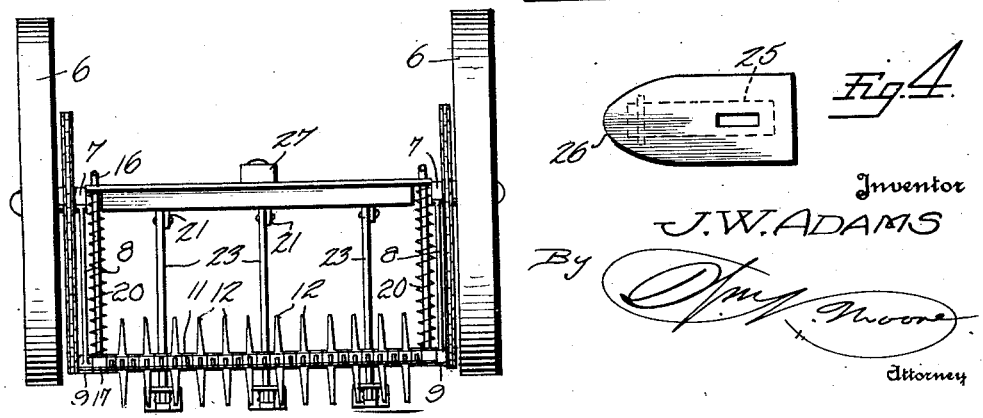
Inventor
J. W. ADAMS
By
Attorney

Patented Nov. 17, 1931

1,832,347

UNITED STATES PATENT OFFICE

JOSEPH W. ADAMS, OF LEXINGTON, KENTUCKY

AGRICULTURAL IMPLEMENT

Application filed November 28, 1930. Serial No. 498,853.

My invention relates to improvements in agricultural implements, and one object of my invention is the provision of an implement which will plow or open a series of furrows and which will break up the clods and place the soil in the best condition for planting.

Another object of my invention is the production of an implement which will be of the most simple, durable and inexpensive construction and from every point of view prove useful, efficient and practical.

With these objects in view my invention consists of an agricultural implement or machine of the character stated embodying novel features of construction and combination of parts, substantially as described and claimed, and as shown in the accompanying drawings, in which:

Figure 1 represents a top plan view of an agricultural implement constructed in accordance with and embodying my invention.

Figure 2 represents a side view or elevation of the implement.

Figure 3 represents a rear end elevation of the implement, and

Figure 4 represents a top plan view of one of the plow points or shovels used in my implement.

In accordance with my invention the implement is of the most simple, durable and inexpensive construction and comprises the open rectangular frame 1, provided with the inclined forward bars 2 and the transverse bar 3, which is in the forward part of the frame and spaced a suitable distance from the front bar of said frame.

In bearings 4, on the underface of the frame is mounted the axle 5, upon the ends of which are carried the ground wheels 6, and having their upper ends 7, swingingly mounted upon said axle are the pair of arms 8, in the lower bearings 9, of which is journaled the shaft 10, upon which are arranged the series of sleeves 11, carrying each a series of teeth 12, which are adapted to revolve through the medium of the pair of small sprocket wheels 13, on said shaft 10, the large sprocket wheels 14, on the axle and the pair of driving sprocket chains 15.

It will thus be apparent that as the machine or implement is drawn over the ground the sleeves with their teeth are rotated rapidly and serve to break up or pulverize the soil, and the swinging frame in which the shaft carrying the teeth is mounted is given a cushioned connection or support from the frame by the pair of rods 16, having their lower ends 17, connected to said swinging frame and their upper ends 18, passing through openings 19, in the main frame, while about said rods are placed coiled springs 20, which form a cushion for the movement of said swinging frame.

From the front transverse bar of the main frame depend the series of lugs 21, to which are pivoted at 22, the upper ends of the inclined arms 23, formed with the vertical branches 23', provided near their lower ends with a series of vertical openings 24, which make an adjustable connection for the foot 25, of the plow point or shovel 26.

The machine or implement may be connected to a tractor or the tongue 27, may be attached to the frame as shown and provide means for draft by animal, and it will be noted that the implement is drawn over the ground and the plows or shovels raise and loosen the soil, and as the implement travels over the ground the revolving teeth follow the gang of shovels or plows and further break up the soil to place such soil in the best possible condition for planting.

The lifters or shovels can be changed as to size and by throwing the teeth out of use, the implement may be used for cultivating all kinds of row crops, and thus it will be noted that I provide an implement which is simple, durable and cheap and which may be used with the plows alone, or with the plows and teeth in conjunction, or with the teeth alone as circumstances require, and all things considered a most useful, practical and efficient implement is provided.

I claim:

An agricultural implement of the character described, comprising a main open rectangular frame, a series of hangers each comprising an upper inclined arm and a lower vertical arm pivotally depending from said frame with the vertical arms provided with a series of vertically arranged openings, a series of adjustable plows carried at the lower ends of said hangers and having each an arm formed with openings to register with the said openings in the vertical arms of said hangers, an axle mounted in said frame, ground wheels on the extended ends of said axle, a frame having its upper ends swung from said axle, a shaft mounted in the lower ends of said frame, means for rotating said shaft from said axle comprising a sprocket wheel on each end of said shaft, large driving sprocket wheels on said axle and a pair of sprocket chains traveling over said sprocket wheels on the shaft and axle, a series of sleeves mounted on said shaft and carrying teeth, and a yielding connection from the main frame to said swinging frame.

In testimony whereof I affix my signature.

JOSEPH W. ADAMS.